US012105474B2

(12) United States Patent
Châtelain et al.

(10) Patent No.: US 12,105,474 B2
(45) Date of Patent: Oct. 1, 2024

(54) OSCILLATOR FOR A TIMEPIECE MOVEMENT AND TIMEPIECE COMPRISING SUCH AN OSCILLATOR

(71) Applicant: Soprod SA, Sion (CH)

(72) Inventors: Christian Châtelain, Tramelan (CH); Sébastien Gigon, Thiébouhans (FR)

(73) Assignee: SOPROD SA, Sion (CH)

( * ) Notice: Subject to any disclaimer, the term of this patent is extended or adjusted under 35 U.S.C. 154(b) by 364 days.

(21) Appl. No.: 17/618,538

(22) PCT Filed: Jun. 22, 2020

(86) PCT No.: PCT/IB2020/055879
§ 371 (c)(1),
(2) Date: Dec. 13, 2021

(87) PCT Pub. No.: WO2021/001722
PCT Pub. Date: Jan. 7, 2021

(65) Prior Publication Data
US 2022/0413437 A1 Dec. 29, 2022

(30) Foreign Application Priority Data
Jul. 2, 2019 (CH) ........................................ 871/19

(51) Int. Cl.
*G04B 17/06* (2006.01)
*G04B 17/34* (2006.01)
*G04B 27/00* (2006.01)

(52) U.S. Cl.
CPC ........... *G04B 17/063* (2013.01); *G04B 17/34* (2013.01); *G04B 27/004* (2013.01)

(58) Field of Classification Search
CPC ..... G04B 17/063; G04B 17/34; G04B 27/004
See application file for complete search history.

(56) References Cited

U.S. PATENT DOCUMENTS 884,852 A * 4/1908 Poruba ................ G04B 17/063 368/325
2,209,172 A 7/1940 Putnam
(Continued)

FOREIGN PATENT DOCUMENTS

CH 27190 A 12/1902
CH 29462 A 8/1903
(Continued)

OTHER PUBLICATIONS

International Search Report for PCT/IB2020/055879, dated Jun. 22, 2020, 2 pages.
(Continued)

*Primary Examiner* — Edwin A. Leon
*Assistant Examiner* — Jason M Collins
(74) *Attorney, Agent, or Firm* — BLANK ROME LLP

(57) ABSTRACT

A balance wheel-hairspring oscillator (10) has a balance wheel shaft (18) intended to be pivotably mounted on a frame of a timepiece. A balance wheel (12) is secured to the balance wheel shaft (18). A hairspring (14) has an inner end (14*a*) secured to the balance wheel shaft and an outer end (14*b*) intended to be connected to a connecting member (16) to the frame. A transmission member (20, 22) is arranged to interact with an escapement. The balance wheel (12) and the hairspring (16) are arranged on either side of the transmission member.

13 Claims, 3 Drawing Sheets

(56) References Cited

U.S. PATENT DOCUMENTS

| | | | | | |
|---|---|---|---|---|---|
| 3,548,586 | A * | 12/1970 | Klinck | G04C 3/06 | 368/162 |
| 4,308,605 | A | 12/1981 | Ayer | | |
| 5,226,023 | A | 7/1993 | Grimm | | |
| 8,240,910 | B2 * | 8/2012 | Orny | G04B 18/006 | 368/169 |
| 8,668,378 | B2 * | 3/2014 | Pellet | G04B 17/06 | 368/127 |
| 2010/0103782 | A1 | 4/2010 | Zaugg et al. | | |

FOREIGN PATENT DOCUMENTS

| | | | |
|---|---|---|---|
| CH | 33235 | A | 3/1905 |
| CH | 682873-85 | | 11/1995 |
| CH | 713649 | B1 | 9/2018 |
| CN | 205958941 | U | 2/2017 |
| DE | 202012002284 | U1 | 4/2012 |
| EP | 0520218 | A1 | 12/1992 |
| EP | 1422579 | A2 | 5/2004 |
| EP | 2315082 | A2 | 4/2011 |
| EP | 2871536 | A1 | 5/2015 |
| FR | 419826 | A | 8/1910 |
| JP | 20100101895 | A | 5/2010 |
| JP | 2014106155 | A | 6/2014 |

OTHER PUBLICATIONS

Office Action in EP20743321, 2 pages.
Office Action in JP2021-572393, 9 pages.
Office Action in counterpart CN202080048439.5 dated Jul. 13, 2024, 7 pages.

* cited by examiner

OSCILLATOR FOR A TIMEPIECE MOVEMENT AND TIMEPIECE COMPRISING SUCH AN OSCILLATOR

RELATED APPLICATIONS

This application is a national phase of PCT/IB2020/055879, filed on Jun. 22, 2020, which claims the benefit of Swiss Application No. CH00871/19, filed on Jul. 2, 2019. The entire contents of these applications are hereby incorporated by reference.

TECHNICAL FIELD

The present invention relates to an oscillator of the balance-hairspring type for a timepiece movement, to a timepiece movement comprising an oscillator of this kind, and to a timepiece comprising such a timepiece movement. The present invention also relates to a stop-seconds device that is arranged to cooperate with the oscillator.

PRIOR ART

There are already multiple oscillators that differ from traditional oscillators in their arrangement relative to the dial of a watch, resulting in an original visual aspect for the watch.

For example, CH713649 discloses a timepiece comprising a hiding device having at least a mobile member and a control mechanism that makes the mobile member move between a closed position in which part of the regulating member, of the balance-hairspring type, is hidden by the hiding device, and an open position in which the balance-hairspring is fully visible. The mobile member is located between the balance and the hairspring when it is in the closed position. The mobile member is located between the balance and the hairspring when it is in the closed position. The hiding device is configured so as to show only the balance when the mobile member is in a closed position. To that end, the balance and the hairspring are mounted on the balance shaft so as to be separated by an axial distance that is sufficient for them to be located on either side of the mobile member when the latter is in a closed position.

EP0520218 discloses a timepiece comprising a dial that is provided with an opening in which there is arranged an oscillator of the balance-hairspring type, such that the oscillator is arranged substantially in the plane of the dial.

DE202012002284U1 discloses a timepiece comprising a dial that is provided with a circular opening inside which there is mounted a tourbillon mechanism that comprises a balance-hairspring, an escapement and an escapement wheel mounted in a tourbillon frame. A display hand is mounted secured to the frame so as to be driven in rotation inside the circular opening at the level of the dial. The tourbillon mechanism is configured in such a way that the balance-hairspring is raised above the dial and oscillates above the display hand.

Moreover, there are numerous stop-seconds mechanisms that serve to stop the seconds hand for precise time setting.

For example, EP1422579 discloses a time setting system comprising a lever that comprises a first portion placed on an upper portion of the plate and a second portion that is orthogonal to the first portion and passes through the upper plate so as to come into contact with the felloe of the balance.

Nonetheless, this system is difficult to integrate into the timepiece movement owing to the shape of the lever which is dictated by the location of the balance in the movement.

One aim of the present invention is to propose an oscillator of the balance-hairspring type, having an original alternative construction.

Another aim of the present invention is to propose a timepiece movement in which the location of the balance makes it possible to simplify the construction of a stop-seconds device.

Another aim of the present invention is to propose a timepiece comprising an oscillator that is arranged in such a way that the timepiece has an original visual appearance.

BRIEF SUMMARY OF THE INVENTION

These aims are achieved with an oscillator of the balance-hairspring type, according to one aspect of the invention, comprising:

a balance shaft intended to be pivotably mounted on a frame of a timepiece, a balance secured to the balance shaft, a hairspring comprising an inner end secured to the balance shaft and an outer end intended to be connected to a connecting member to said frame, and a transmission member arranged to interact with an escapement. The balance and the hairspring are arranged on either side of the transmission member.

According to one embodiment, the balance and the hairspring are mounted respectively at a first and a second end of the balance shaft.

According to one embodiment, the transmission member is in the form of a double disk comprising a peg that is intended to cooperate with an escapement anchor.

According to one embodiment, the inner end of the hairspring is secured to a collet mounted at the second end of the balance shaft.

According to one embodiment, a spacer is mounted on the balance shaft between the collet and the transmission member.

Another aspect of the invention relates to a timepiece movement comprising the oscillator as described above.

According to one embodiment, the timepiece movement comprises a plate and the oscillator is mounted in the timepiece movement in such a way that the balance and the hairspring are arranged on either side of the plate.

According to one embodiment, the timepiece movement comprises a dial and a stop-seconds device arranged entirely on the upper part of the plate on the dial side.

According to one embodiment, the stop-seconds device comprises a rocker mounted on said upper part of the plate. The rocker comprises a lever portion arranged to cooperate with a sliding pinion of a winding mechanism and an engagement portion that is arranged to cooperate with a portion of the felloe of the balance. The lever portion and engagement portion are arranged on either side of the pivot axis of the rocker.

According to one embodiment, the distal end of the lever portion of the rocker is arranged to cooperate with a pull-out piece of the winding mechanism. The pull-out piece is pivoted when the winding mechanism shaft is actuated from a first axial position to a second axial position corresponding to the time-setting position. The pivoting of the pull-out piece actuates the rocker in rotation about its pivot axis in order that, on one hand, the distal end of the engagement portion comes to abut against a portion of the perimeter of the felloe of the balance in order to immobilize the balance, and, on the other hand, the sliding pinion comes to mesh with the setting wheels and the dial train in order to control the hands for setting the movement to the correct time.

Another aspect of the invention relates to a timepiece comprising a watch case incorporating the timepiece movement as described above. The balance is arranged at the level of the dial while the hairspring is arranged towards the back of the watch case.

BRIEF DESCRIPTION OF THE FIGURES

Exemplary embodiments of the invention are indicated in the description illustrated by the appended figures, in which.

EXEMPLARY EMBODIMENT(S) OF THE INVENTION

Figure 1:
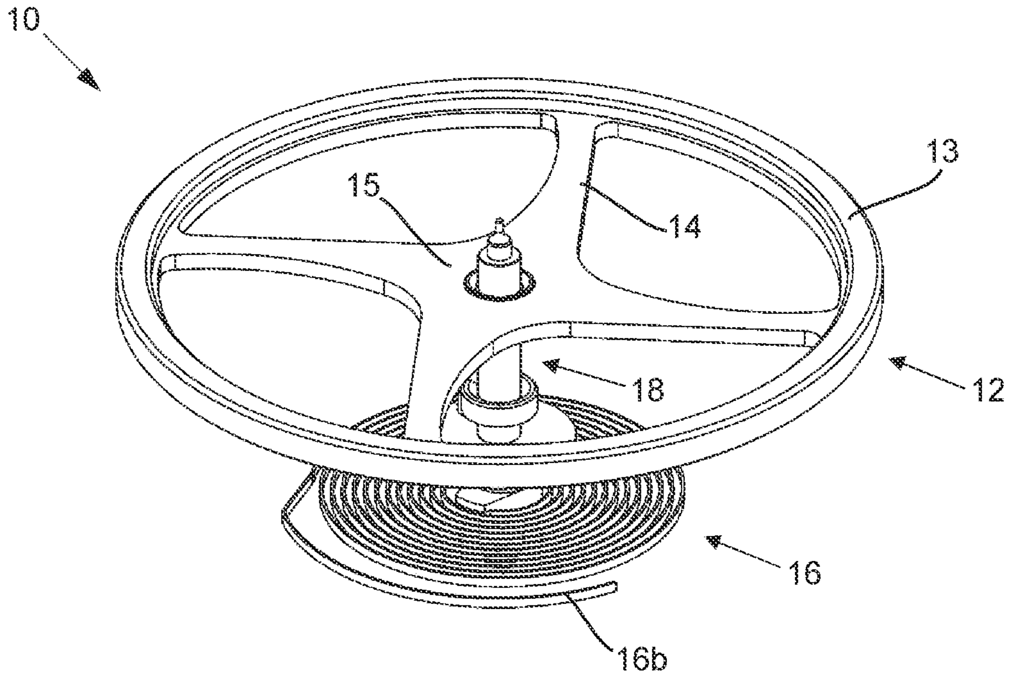
FIG. 1 shows a perspective view of the oscillator of the balance-hairspring type, according to one embodiment of the invention.
Figure 2:
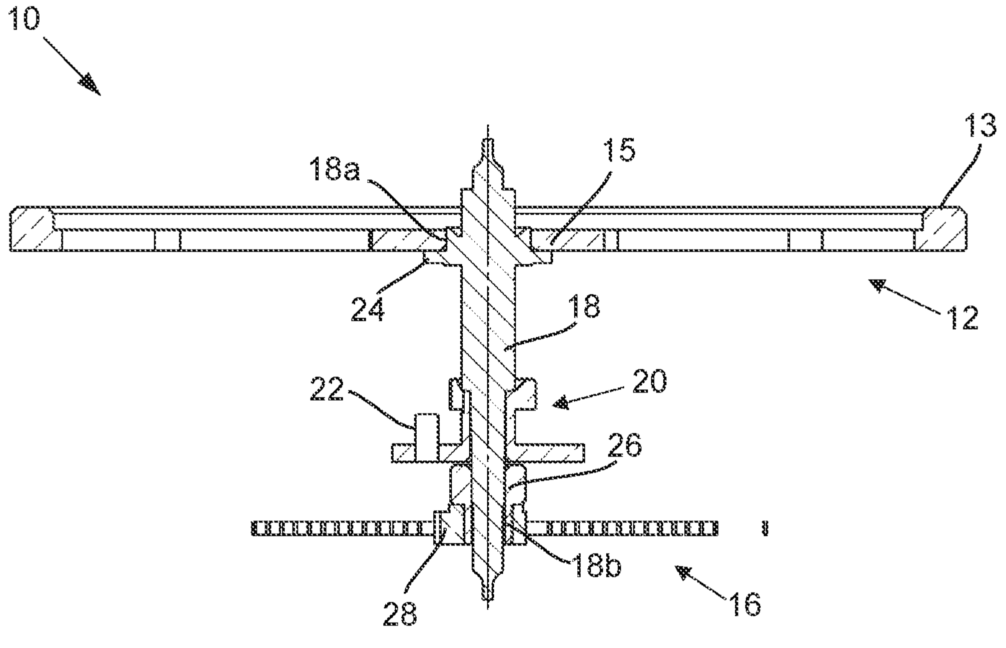
FIG. 2 shows a view in section at the level of the balance shaft of the oscillator of FIG. 1.

As shown in FIGS. 1 and 2, the oscillator 10 comprises a balance 12, a hairspring 16 and a balance shaft 18. The balance 12 comprises a felloe 13, a hub 15 and multiple arms 14 connecting the felloe 13 to the hub 15. The hub 15 of the balance 12 is mounted at a first end of the balance shaft 18, at the level of a first segment 18*a* of the shaft 18 and against a shoulder 24 in order to ensure that the balance 12 oscillates in a plane perpendicular to its axis of rotation.

The hairspring 16 is mounted at a second end of the balance shaft 18, at the level of the second segment 18*b* of the shaft 18. The inner end 16*a* of the hairspring is secured to a collet 28. The collet 28 is mounted on the second segment 18*b* of the balance shaft 18 by means of a spacer 26 that comprises a first portion 26*a* having a first diameter and a second portion 26*b* having a second diameter that is greater than the first diameter 26*a*.

The collet 28 is mounted on the first portion 26*a* of the spacer 26, for example by driving or riveting, while the second portion 26*b* of the spacer 26 is arranged between the collet 28 and a transmission member secured to the balance shaft 18. This transmission member is preferably in the form of a double disk 20 comprising a peg 22 that is intended to cooperate with an escapement anchor (not shown) in order to regulate the running of a timepiece movement. According to one embodiment, the spacer 26 is formed integrally with the transmission member. In the embodiment of FIGS. 1 and 2, the balance 12 and the hairspring 16 are arranged on either side of the transmission member. In other words, the transmission member and the hairspring 16 are on the same side of the balance 12.

Figure 3:
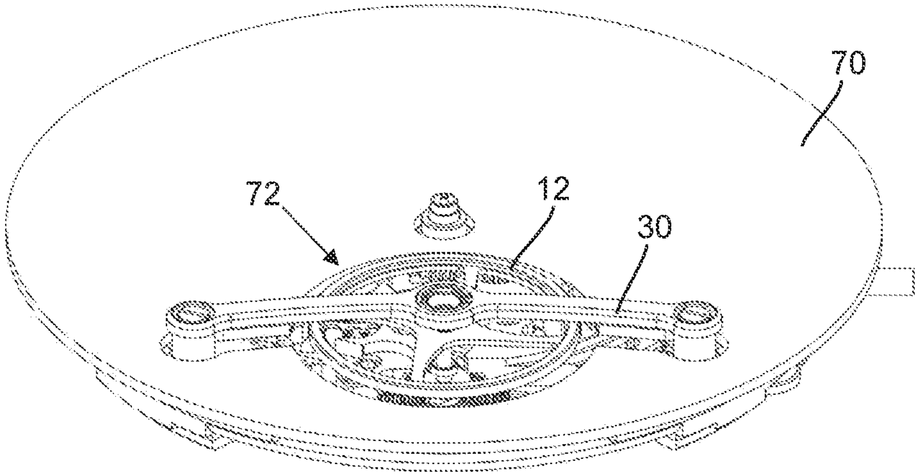
FIG. 3 shows a perspective view of a timepiece movement with a dial comprising the oscillator of FIG. 1.
Figure 4:
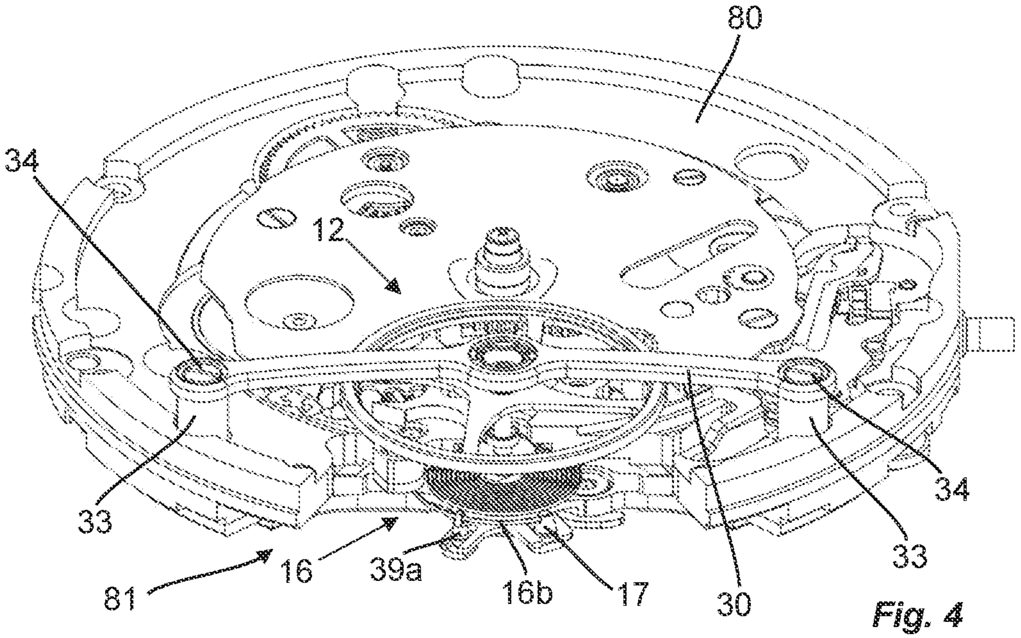
FIG. 4 shows a view similar to FIG. 3, without the dial.
Figure 5:
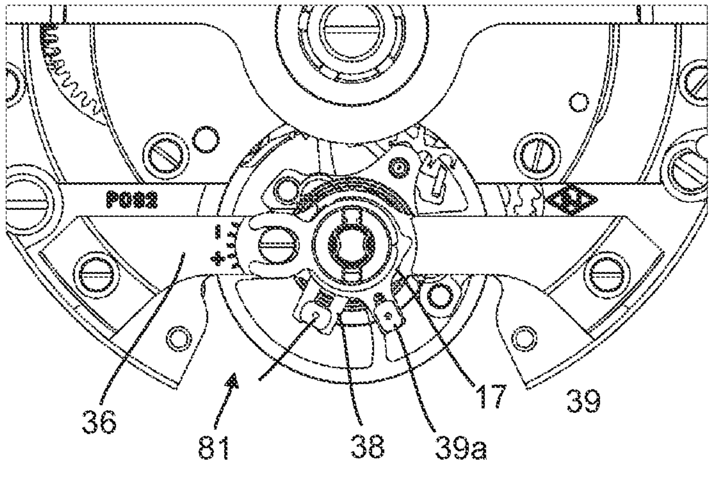
FIG. 5 shows a partial view from below of the timepiece movement at the level of the oscillator.

FIGS. 3 to 5 show a timepiece movement comprising a plate 80. The oscillator is mounted in the timepiece movement in such a way that the balance 12 and the hairspring 16 are arranged on either side of the plate 80. For example, the balance 12 is arranged on the display side of the plate 80 and the hairspring is arranged on the opposite (back) side of the plate 80. In the example of FIG. 3, the timepiece movement comprises a dial 70. The oscillator 10 is mounted in the timepiece movement in such a way that the balance 12 is arranged at the level of the dial 70, for example in a circular opening 72 created on the dial 70. The balance 12 may equally be arranged above the dial 70. The hairspring 16 is for its part arranged on the opposite side of the plate. For example, the hairspring 16 is arranged so as to be located on the side of the back of a watch case (not shown) when the movement is incorporated into the watch case of a timepiece. According to one variant, the timepiece has no dial or has only a partial dial with a cutout in the shape of an arc of a circle so as to only partially surround the balance of the movement.

The ends of the balance shaft 18 are mounted in a first and a second bearing (not shown) that are arranged respectively on a first and a second balance bridge 30, 36, these being mounted on the plate 80, respectively on the dial side and the back side. The ends of the first balance bridge 30 are attached to the plate 80 by two screws 34. These screws are also screwed into two attachment cylinders 33 arranged between the ends of the first balance bridge 30 and the plate 80. The height of the attachment cylinders 33 has been adjusted so that the balance 12 of the oscillator 10 is arranged in the opening 72 at the level of the dial 70. It is noted that a decoration can be machined onto the first balance bridge 30, on the dial side, in order to improve the esthetic appearance of the timepiece movement comprising the oscillator 10.

As shown in FIG. 5, the second balance bridge 36 comprises a hairspring stud support 38 in which is attached a hairspring stud 17 secured to the outer end of the hairspring 16. A regulator assembly system is also mounted on the second balance bridge 36. The regulator assembly system comprises a regulator 39 for adjusting the active length of the hairspring 16 in order to correct running discrepancies during a quality control. To that end, the regulator 39 comprises an arm supporting a lug 39*a* that is provided with a slot in which is arranged a segment of the hairspring 16. The regulator 39 is fitted onto the second balance bridge 36 with heavy friction. As shown in FIGS. 4 and 5, the plate 80 is provided with a cutaway 81 through which the oscillator 10 can pass when mounted in the movement. The cutaway 81 is semicircular in shape and open at the periphery of the plate 80, but may equally have any other shape that is appropriate for assembling the oscillator 10 in the movement.

Figure 6A:
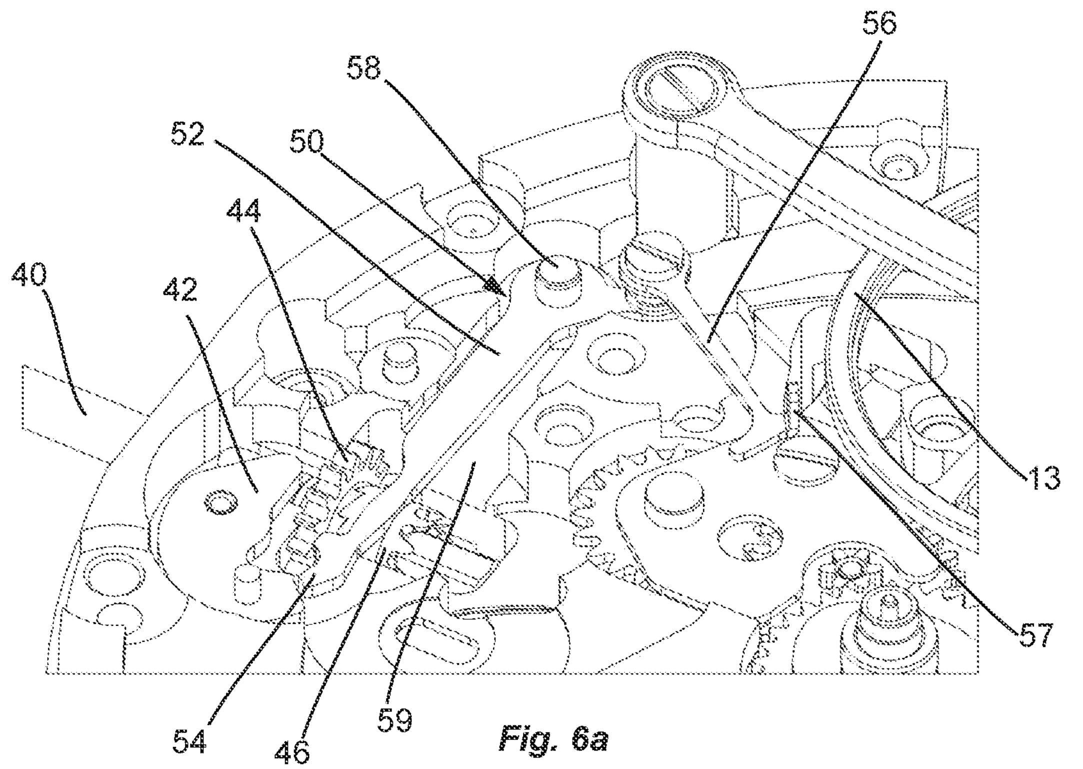
FIG. 6*a* shows a perspective view of a portion of upper parts of the plate of the timepiece movement comprising a stop-seconds device in a non-operational configuration.
Figure 6B:
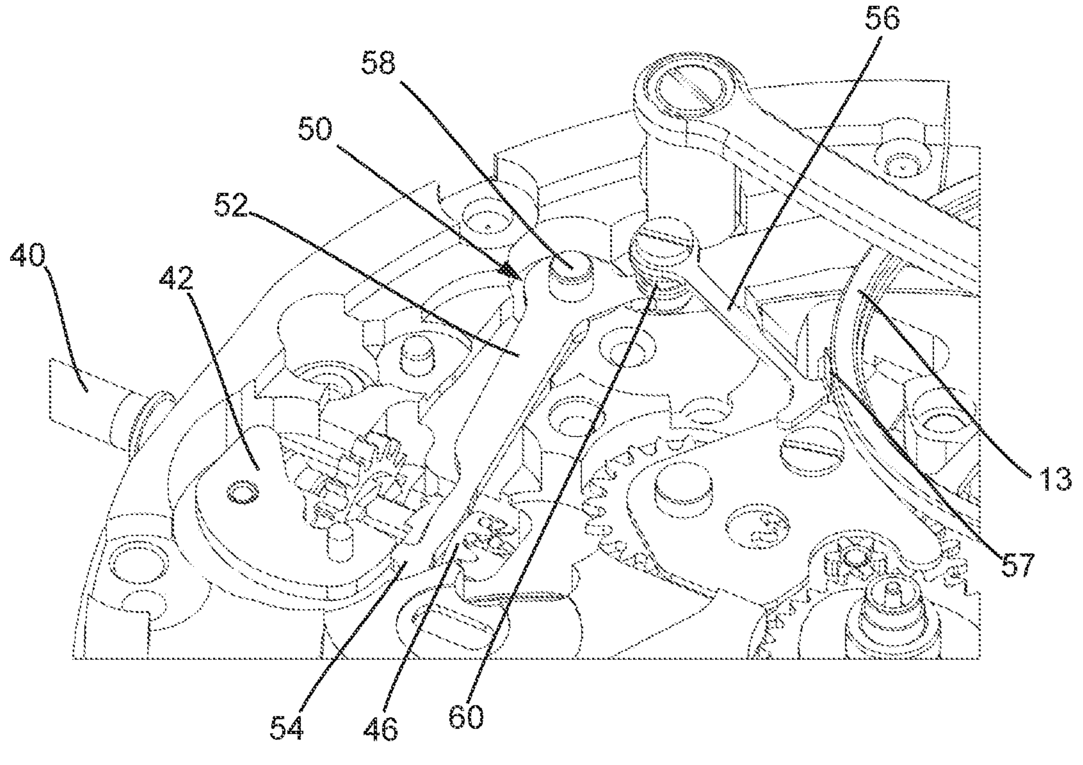
FIG. 6*b* represents a view similar to FIG. 6*a* when the stop-seconds device is actuated.

As shown in FIGS. 6*a* and 6*b*, the timepiece movement comprises a stop-seconds device that cooperates with the winding mechanism shaft 40 of the timepiece movement. The stop-seconds device comprises a rocker 50 which has the advantage of being arranged in a milled channel 59 created in the dial side of the upper plate 80, which channel makes it easier to integrate the stop-seconds device into the timepiece movement.

The rocker 50 is mounted so as to be able to pivot about a post 58 inside the milled channel 59. This rocker is created by joining together two distinct parts, a lever 52 that is arranged so as to cooperate with the winding mechanism shaft 40 and an engagement arm 56 comprising, at its distal end, a blocking fin 57 that is arranged to come to abut against a portion of the perimeter of the felloe 13 of the balance 12 when the stop-seconds device is actuated.

The engagement arm 56 is connected to the lever 52 of the rocker 50 so as to rock in a plane parallel to the plane in which the lever 52 is arranged. To that end, a spacer 60 is fitted between the lever 52 and the engagement arm 56 so that the blocking fin 57 of the engagement arm is at the same height as the balance 12. Furthermore, the engagement arm 56 and the lever of the rocker 50 are arranged on either side of the post 58 about which the rocker 50 pivots, and form between them an angle of between 30° and 60°. According to one variant, the rocker 50 is formed in one piece comprising an engagement portion and a lever portion. According to one embodiment, the spacer 60 is formed integrally with the lever 52 and the engagement arm 56.

The lever 52 of the rocker 50 engages with a sliding pinion 46 that is arranged against the winding mechanism pinion 44 when the timepiece movement is running. The distal end of the lever 52 comprises a finger 54 that is arranged to cooperate with a pull-out piece 42 of the winding mechanism of the timepiece movement. The pull-out piece 42 is arranged to pivot about its pivot axis when the winding mechanism shaft 40 is actuated from a first axial position to a second axial position corresponding to the position for setting the time.

The pivoting of the pull-out piece 42 exerts a force against the finger 54 of the rocker 50 so as to make the latter rotate about the post 58. The pivoting of the rocker 50 serves, on one hand, to bring the blocking fin 57 of the engagement portion 56 into abutment against a portion of the perimeter of the felloe 13 of the balance 12 in order to immobilize the balance and, on the other hand, to move the sliding pinion 46 away from the winding mechanism pinion 44 until it meshes with the setting wheels and the dial train in order to control the hands for setting the movement to the correct time.

LIST OF REFERENCES

- Oscillator 10
  - Balance 12
    - Felloe 13
    - Arm 14
    - Hub 15
  - Hairspring 16
    - Inner end 16*a*
    - Outer end 16*b*
      - Hairspring stud 17
    - Balance shaft 18
      - First segment 18*a*
      - Second segment 18*b*
      - Transmission member
        - Double disk 20
        - Disk peg 22
      - Shoulder 24
      - Spacer 26
        - First portion 26*a*
        - Second portion 26*b*
        - Collet 28
  - First balance bridge 30
    - First bearing
    - Attachment cylinders 33
    - Screws 34
  - Second balance bridge 36
    - Second bearing
    - Hairspring stud support 38
    - Regulator 39
    - Lug 39*a*
  - Winding mechanism
    - Winding mechanism shaft 40
    - Pull-out piece 42
    - Winding mechanism pinion 44
    - Sliding pinion 46
  - Stop-seconds device
    - Rocker 50
      - Lever 52
        - Finger 54
      - Engagement arm 56
        - Blocking fin 57
    - Tenon 58
    - Milled channel 59
    - Spacer 60
  - Dial 70
    - Opening 72
  - Plate 80
    - Cutaway 81

The invention claimed is:

1. A balance-hairspring oscillator comprising:

a balance shaft intended to be pivotably mounted on a frame of a timepiece;

a balance secured to the balance shaft;

a hairspring comprising an inner end secured to the balance shaft and an outer end intended to be connected to a connecting member to said frame, and a transmission member arranged to interact with an escapement wherein the transmission member and the hairspring are arranged on the same side of the balance, and wherein the transmission member is in the form of a double disk comprising a peg that is intended to cooperate with an escapement anchor.

2. The oscillator as claimed in claim 1, wherein the balance and the hairspring are mounted respectively at a first and a second end of the balance shaft.

3. The oscillator as claimed in claim 2, wherein the inner end of the hairspring is secured to a collet mounted at the second end of the balance shaft.

4. The oscillator as claimed in claim 3, wherein a spacer is mounted on the balance shaft between the collet and the transmission member.

5. The oscillator as claimed in claim 4, wherein the spacer is formed integrally with the transmission member.

6. A timepiece movement comprising a balance-hairspring oscillator comprising a balance shaft intended to be pivotably mounted on a frame of a timepiece; a balance secured to the balance shaft; a hairspring comprising an inner end secured to the balance shaft and an outer end intended to be connected to a connecting member to said frame; and a transmission member arranged to interact with an escapement; wherein the transmission member and the hairspring are arranged on the same side of the balance, and wherein the transmission member is in the form of a double disk comprising a peg that is intended to cooperate with an escapement anchor.

7. The timepiece movement as claimed in claim 6, comprising a plate, the oscillator being mounted in the timepiece movement in such a way that the balance and the hairspring are arranged on either side of the plate.

8. The timepiece movement as claimed in claim 7, wherein the plate comprises a cutaway.

9. The timepiece movement as claimed in claim 7, comprising a dial and wherein the balance is arranged at the same level as or above the dial.

10. The timepiece movement as claimed in claim 7, comprising a stop-seconds device arranged entirely on the upper part of the plate.

11. The timepiece movement as claimed in claim 10, wherein the stop-seconds device comprises a rocker mounted on said upper part of the plate and comprising a lever portion arranged to cooperate with a sliding pinion which is arranged so as to move along a winding mechanism shaft, and an engagement portion that is arranged to cooperate with a portion of the perimeter of the felloe of the balance, said lever portion and engagement portion being arranged on either side of the pivot axis of the rocker.

12. The timepiece movement as claimed in claim 11, wherein the distal end of the lever portion of the rocker is arranged to cooperate with a pull-out piece of the winding mechanism, the pull-out piece being pivoted when the winding mechanism shaft is actuated from a first axial position to a second axial position corresponding to the time-setting position, wherein the pivoting of the pull-out piece actuates the rocker in rotation about its pivot axis in order that, on one hand, the distal end of the engagement portion comes to abut against a portion of the perimeter of the felloe of the balance in order to immobilize the balance, and, on the other hand, the sliding pinion comes to mesh with the setting wheels and the dial train in order to control the hands for setting the movement to the correct time.

13. A timepiece comprising a watch case incorporating the timepiece movement according to claim 6, wherein the balance is arranged at the level of or above the dial, and in that the hairspring is arranged towards the back of the watch case.

* * * * *